United States Patent Office 3,032,609
Patented May 1, 1962

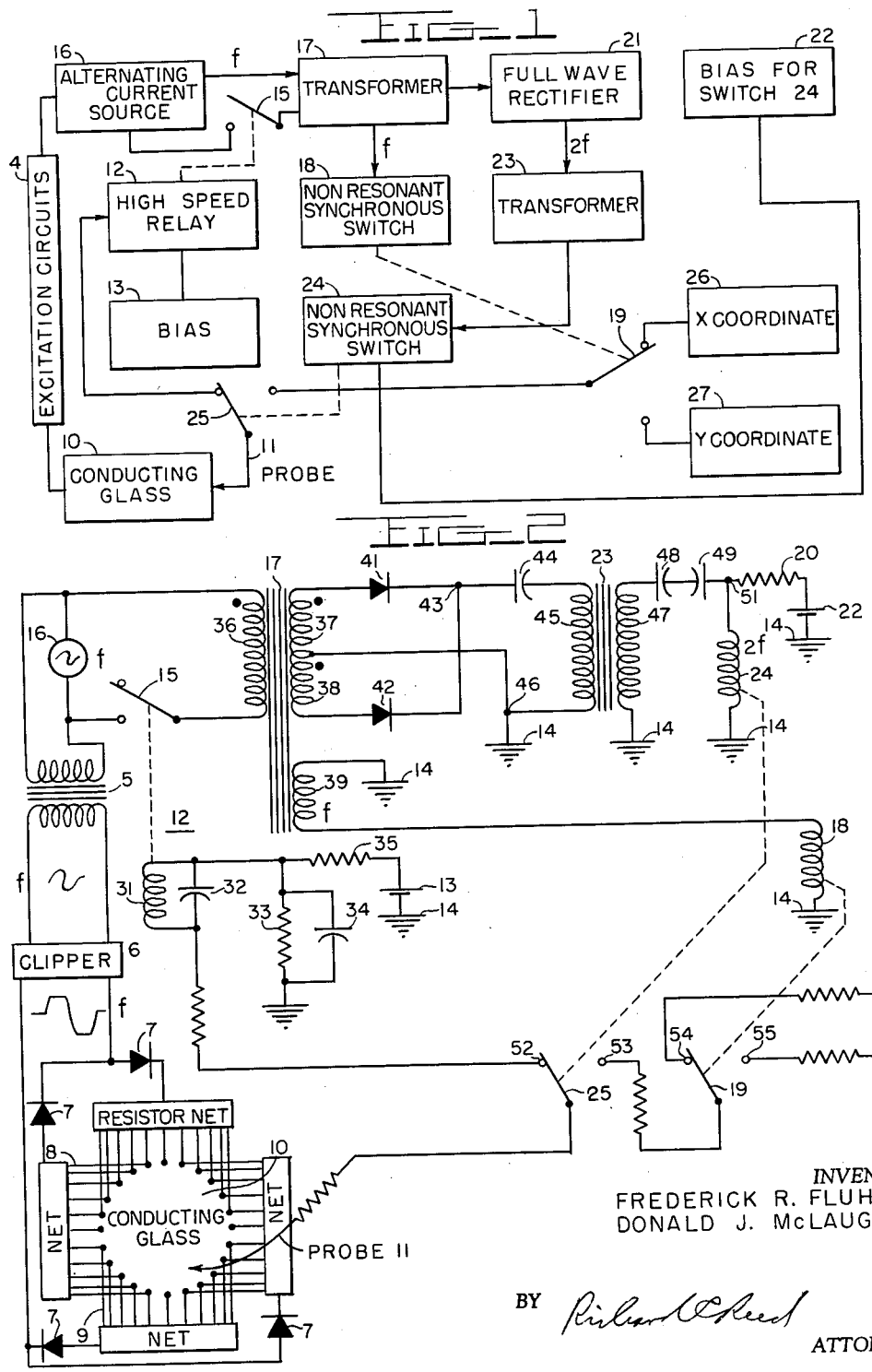

3,032,609
POSITION TO VOLTAGE TRANSLATOR
Frederick R. Fluhr, Fort Foote, Md., and Donald J. McLaughlin, Washington, D.C., assignors to the United States of America as represented by the Secretary of the Navy
Filed Sept. 30, 1959, Ser. No. 843,600
4 Claims. (Cl. 178—18)
(Granted under Title 35, U.S. Code (1952), sec. 266)

The invention described herein may be manufactured and used by or for the Government of the United States of America for governmental purposes without the payment of any royalties thereon or therefor.

This invention pertains to position to voltage translators and, more particularly to excitation and detection units of Cartesian coordinate voltages on a conducting glass.

When it is desired that the position coordinates of a signal on a cathode ray tube screen, for example, be obtained in electrical form, a conducting glass overlay is employed. Such conducting glass overlay has a conducting surface of tin oxide compound, and the resistivity per square is a known value. Equipotential lines are formed horizontally and vertically and uniformly distributed when the glass is sequentially excited by switched direct current values. The coordinate values of a particular point on the conducting glass are determinable from the switched D.C. analog voltage sensed by a probe placed in contact with the conducting glass at the particular point.

The circuit of this invention is concerned with the detection of the alternately presented switched D.C. coordinate voltage so as to deliver the output of the single conductor probe to two circuits, being synchronized so as to present the horizontal coordinate D.C. analog voltage to one circuit, and the vertical coordinate D.C. analog voltage to the other circuit.

The United States Patents 2,704,305, dated March 15, 1955, entitled, "Resistive Surface Voltage Divider Network," to McLaughlin et al. and 2,900,446 dated August 18, 1959 entitled, "Telescriber System" to McLaughlin et al. present the environment and general purpose of the instant invention, which is an improvement thereover.

Previous position to voltage translators were limited in accuracy of derived voltage outputs, were comparatively slow in response in switching operations, and the operational life was limited by the maintenance of the electromechanical elements which remained in an active state even when the probe was not in contact with the conducting glass. Also, serious adverse effects were produced by frequency variations in the power source.

An object of this invention is, therefore, to provide a position to voltage translator having the desirable capabilities and properties and none of the deficiencies set forth above.

Another object of this invention is to provide a detector unit which separates alternately presented signals through a single conductor to two respective outputs.

Other objects and advantages of this invention will hereinafter become more fully apparent from the following description of the annexed drawings, which illustrate a preferred embodiment, and wherein:

FIG. 1 shows, in block diagram, a detector unit constructed in accordance with the principles of this invention.

FIG. 2 shows a schematic diagram of a preferred embodiment of the position to voltage translator of this invention.

Briefly, the circuit of this invention is a detector unit which relegates alternately presented inputs to alternately connected outputs. The placement of a probe on a point on a sequentially excited conducting glass surface provides a voltage level which is representative of the position of the point along an equipotential line relative to the limits of the overall applied voltage first in one direction and then in a second direction which is disposed ninety degrees with respect to the first direction. This circuit also senses whether the probe is in contact with the conducting glass surface or not.

The probe has only a single conductor for both of the coordinate voltages. This requires that the voltages be separated in time in order that they can pass through the single conductor without interfering with each other. The circuit of this invention provides a unique switching arrangement whereby the coordinate voltage of one direction is connected only to the circuitry which utilizes such coordinate and whereby the coordinate voltage of the other direction will be connected only to the circuitry which utilizes such second direction coordinate, while sensing whether the probe is in contact with the conducting glass surface or not during the intervening periods.

This is accomplished by the inclusion of a selector switch which switches from one output to the other in synchronism with the alternate presentation of the coordinate energization; and by the inclusion of a control switch which operates at twice the frequency of the selector switch so as to be able to connect each of the outputs selected by the selector switch and to energize circuitry which will maintain the operation so long as the probe is on the conducting glass.

Referring now to the drawings, wherein like reference numerals designate like structure through the two figures, FIG. 1 shows, in block diagram, the complete position to voltage translator with the conducting glass 10 and the probe 11. The probe 11 is connected through a moving contact 25, controlled by a high speed synchronous relay 24, to a high speed relay 12 or to a second moving contact 19, controlled by a high speed nonresonant synchronous relay 18. The moving contact 19 selectively connects to an X coordinate output 26 or to a Y coordinate output 27. The high speed relay 12 controls a moving contact 15 which determines the connection of an alternating current source 16 of frequency $f$ to a first transformer 17. A D.C. voltage source 13 is supplied to the high speed relay 12 to close the normally open moving contact 15 when the probe 11 is in contact with the conducting glass 10. A first output winding on the transformer 17 is connected to a full wave rectifier 21 to provide an output of frequency $2f$ wh'ch is supplied to a second transformer 23. Connected to the secondary winding of transformer 23 is a high speed nonresonant synchronous relay 24 with a bias voltage source 22 supplied thereto to maintain the moving contact 25 of relay 24 in connection with the high speed relay 12 when the probe 11 is not in contact with the conducting glass 10.

FIG. 2 shows the conducting glass 10 with the two perpendicular resistance networks 8 and 9 thereon which cause the excitation to be horizontal and vertical in sequential fashion. The conducting glass is excited by a source frequency $f$ through an appropriate squaring network. Probe 11 is represented by an arrow, and a resistance symbol is included to represent the inherent resistance of the probe. Probe 11 is connected to a first high speed nonresonant synchronous relay 24 which inclcudes moving contact 25, which is selectively connected to either of two terminals 52 and 53. Terminal 52 is connected through a current limiting resistor to a first end of a relay coil 31. Connected across relay coil 31 is a capacitor 32 designated as a hold capacitor. Connected to the second end of relay coil 31 are one end of a bypass filter, which inclues a resistor 33 and a capacitor 34 connected in parallel, and one end of a current limiting resistor 35. To the other end of resistor 35 is connected a direct current source 13. The other end of the by-pass filter and the other end of the bias source are connected to a common return 14.

A moving contact 15 is operated by the relay coil 31 to open and close a circuit which includes an alternating current source 16, which operates at frequency $f$ and the primary winding 36 of a transformer 17. A secondary center-tapped winding 37, 38 on transformer 17 is connected at each end to a like polarized side of one of two uni-directional elements 41 and 42. The other sides of the unidirectional elements 41 and 42 are connected at a common junction 43. A primary winding 45 on a second transformer 23 is connected at one end to junction 43 in seires with capacitor 44 and at its other end to the center tap of secondary winding 37, 38 through a junction 46 which is connected to the common return 14. The secondary winding 47 of the second transformer 23 is connected at one end to the common return 14. The other end of secondary winding 47 is connected in series with two electrolytic capacitors 48 and 49, which are series connected back-to-back. A single non-polar capacitor can replace the two electroyltic capacitors 48 and 49. Connected to a junction 51 are: one side of capacitor 49, one end of the relay coil in high speed relay 24, and, through a current limiting resistor 20, a bias source 22. The second end of the relay coil in relay 24 and the other side of the bias source 22 are connected to the common return 14.

A tertiary winding 39 on transformer 17 is connected at one end to common return 14. At the other end, winding 39 is connected to one end of the relay coil of a high speed relay 18, which includes moving contact 19. Terminals 54 and 55 are selectively contacted by moving contact 19 to connect output terminals 26 and 27, respectively. Current limiting resistors are included between the pairs of connected terminals. Terminal 53 in relay 24, which is contacted by moving contact 25, is connected to moving contact of relay 18 with a current limiting resistor therebetween.

To the alternating current source 16 is also connected a transformer 5 with its alternate current output supplied to a clipperr 6 which provides a substantially square wave output. This square wave is utilized as a pulsed direct current by resistor nets 8 and 9. The energization in selected coordinate directions is controlled by four diodes 7 which are connected in such a manner as to pass the positive square portion through the horizontal net 8 and to pass the negative square portion through the vertical net 9, for example. Herein is the separation in time of the X and Y coordinate excitation and, also, the synchronization of output connection of all X excitation pulses with the X output and all Y excitation pulses with the Y output. The aforementioned United States Patent 2,900,446 to McLaughlin et al. discloses such excitation and separation circuitry in detail. The excitation circuits 4 of FIG. 1 are shown as transformer 5, clipper 6, diodes 7 and resistor nets 8 and 9 in FIG. 2.

In the operation of the circuit of this invention, when the probe 11 is not in contact with the conducting glass surface 10, the moving contact of relay, or chopper 24, being biased by bias source 22, connects to the coil 31 of the high speed relay 12. The movable contact 15 of relay 12 is in open position when the probe is not in contact with the conducting glass.

When the probe is placed in contact with the conducting glass, relay 12 operates to close moving contact 15. This is accomplished by the completion of the current path from the direct current voltage source 13 through current limiting resistor 35, relay coil 31 of relay 12, probe 11 and the circuitry connected to the conducting glass 10. Capacitor 32 keeps relay 12 energized during the half-cycle of the 2$f$ rate that the probe is not connected to relay 12. The by-pass filter made up of resistor 33 and capacitor 34 is included to filter out any noise that might be introduced into the current produced by source 13. The magnitude of the potential across voltage source 13 exceeds any voltage that is produced on the conducting glass surface by the excitation circuits.

The closing of moving contact 15, transformer 17 is energized by the alternating current source 16 at frequency $f$. The high-voltage secondary 37, 38 of transformer 17 is full-wave rectified thus producing frequency 2$f$ and A.C. coupled to transformer 23, which transforms the double-frequency waveform to the proper impedance level for driving relay, or chopper, 24. The low-voltage tertiary winding 39 of transformer 17 drives the relay, or chopper, 18 at the line frequency $f$. Relay 24, operating at twice line frequency, or 2$f$, alternately switches the probe output from the sensing relay 12 to the moving contact 19 of relay 18. Relay 18, running at the line frequency $f$ and in proper phase with the exciting waveform to the resistor nets 8 and 9, alternately connects the X and Y coordinate outputs to the probe.

When the conducting glass is being excited in the X direction, the probe 11 is connected to the X coordinate output during the time that the pulsed D.-C. input is at a constant level of positive potential, for example, and likewise for the Y coordinate for negative excitation of the conducting glass. Each coordinate output is thus periodically connected to the probe slightly less than one fourth of the period of the conducting glass exciting waveform. Small series resistors are used to limit the charging currents through the chopper contacts.

In the complete system of which the circuit of this invention is a part, the X and Y coordinate outputs 26 and 27 are the inputs to temporary storage devices which feed the stored information into a computer when the probe is removed from the conducting glass. The temporary stores are rapidly charged (within three or four cycles; one cycle equals one RC time constant) to the X and Y voltages being sensed by the probe. When the probe is lifted from the conducting surface, relay 12 de-energizes, causing the two nonresonant synchronous switches 18 and 24 to stop.

This voltage to position translator will operate over a range of from 30 c.p.s. to approximately 1000 c.p.s. (the limit of relay 24, since its must operate at 2$f$), without modification. However, capacitor 32 should be optimized such that the relay 12 will be held energized for only slightly more than one fourth the period of the line frequency, in order that relay 12 response can be as rapid as possible.

The circuit of this invention is disclosed in Naval Research Laboratory Report 5248 dated January 8, 1959 entitled, "The Naval Data Handling System Pickoff Display Converter" by F. R. Fluhr and D. J. McLaughlin.

Since many variations of the specific embodiment described above will occur to those skilled in the art, the invention is to be limited only as specified in the following claims.

What is claimed is:

1. In a position to voltage translator,
    an alternating current source,
    a conducting glass surface,
    excitation circuit means connected to said alternating current source and to said conducting glass surface to produce equipotential parallel lines on said conducting glass surface in a vertical direction for one coordinate and in a horizontal direction for a second coordinate in synchronization with the positive and negative half cycles of the alternating current source,
    a probe for contacting said surface,
    control means connected to said probe,
    means connected to said source for providing
        a frequency double the operating frequency of said source,
    selecting means connected to said control means,
    means connected to said alternating current source for controlling said selecting means at the same frequency at which said source is generating and said conducting glass surface is being excited, means connected to said frequency doubling means for operating said control means at twice the frequency at which said source is generating and said conducting glass surface is being excited, first output means to which a coordinate value in the vertical direction can be applied, second output means to which a coordinate value in the horizontal direction can be applied, said output means connected to said selecting means whereby said selecting means will switch from one output to the other in synchronism with the excitation of the conducting glass surface 2. In a position to voltage translator, an alternating current source, a conducting glass surface, excitation circuit means connected to said alternating current source and to said conducting glass surface to produce equipotential parallel lines on said conducting glass surface in a vertical direction for one coordinate and in a horizontal direction for a second coordinate in synchronization with the positive and negative half cycles of the alternating current source, a probe for contacting said surface, first, second and third high speed relays, means whereby said first relay selectively connects said probe to said second or said third relay, a full wave rectifier, means connecting said full wave rectifier to said alternating source, means whereby said third relay is powered by said alternating source, said second relay being operative to switch the alternating current source in and out of circuit with said full wave rectifier and said third relay, thereby providing an energizing potential for said rectifier and said third relay, means whereby said first relay is operated by said full wave rectifier so as to be operating at wtice the frequency of the other two relays, first output means to which the coordinate voltage values on the vertical equipotential lines are applied, second output means to which the co-ordinate voltage values on the horizontal equipotential lines are applied, means connected to said third relay for selecting one of said output means whereby the selection is in synchronization with the energization circuit means.

3. In a position to voltage translator, an alternating current source, a conducting glass surface, excitation circuit means connected to said alternating current source and to said conducting glass surface to produce equipotential parallel lines on said conducting glass surface in a vertical direction for one coordinate and in a horizontal direction for a second coordinate in synchroniznation with the positive and negative half cycles of the alternating current source, a probe for contacting said surface, first, second and third high speed relays, means whereby said first relay selectively connects said probe to said second or said third relay, a full wave rectifier, means connecting said full wave rectifier to said alternating source, means whereby said third relay is powered by said alternating source, means whereby said second relay operates to switch the alternating current source in and out of circuit with said full wave rectifier and said third relay thereby providing an energizing potential for said rectifier and said third relay, a direct current source means connected to said second relay for maintaining the alternating current source out of circuit with said full wave rectifier and said third relay when the probe is not in contact with the conducting surface, means whereby said first relay is operated by said full wave rectifier whereby said first relay will operate at twice the frequency of the other two relays, bias means to maintain said first relay connected to said second relay when the probe is not in contact with said conducting glass, first output means to which the co-ordinate voltage values on the vertical equipotential lines are applied, second output means to which the coordinate voltage values on the horizontal equipotential lines are applied, means connected to said third relay for selecting one of said output means whereby the selection is in synchronization with the energization circuit means.

4. In a position to voltage translator, conductive surface means having two sets of equipotential lines orthogonally disposed thereon, means for alternately exciting said sets of equipotential lines, probe means for contacting intersections of equipotential lines, control means connected to said probe, means for operating said control means at a frequency twice that which excites said sets of equipotential lines, selecting means connected to said control means whereby said control means causes an energizing potential from said conductive surface means to be applied to said selecting means whenever the probe is contacting the conducting surface, means connected to said selecting means for operating said selecting means at the same frequency as the frequency which excites said set of equipotential lines, first output means to which coordinate voltage values of one of said sets of equipotential lines are applied, second output means to which coordinate voltage values of the second of said sets of equipotential lines are applied, said output means connected to said selecting means whereby said selecting means will switch from one output means to the other in synchronism with the alternate presentation of coordinate energization.

References Cited in the file of this patent

UNITED STATES PATENTS

| | | |
|---|---|---|
| 2,565,612 | Levin | Aug. 28, 1951 |
| 2,704,305 | McLaughlin | Mar. 15, 1955 |
| 2,900,446 | McLaughlin | Aug. 18, 1959 |